United States Patent [19]

Rudy et al.

[11] 4,277,190
[45] Jul. 7, 1981

[54] INDICIA PRINTER

[75] Inventors: Michael W. Rudy, Thousand Oaks; Thomas D. Horning, Sepulveda; Edward J. Kraemer, Canoga Park, all of Calif.

[73] Assignee: Terminal Data Corporation, Woodland Hills, Calif.

[21] Appl. No.: 68,857

[22] Filed: Aug. 21, 1979

[51] Int. Cl.³ .................. B41J 11/42; G03B 27/52
[52] U.S. Cl. ........................................ 400/582; 355/40
[58] Field of Search ............... 400/124, 582, 627; 101/93.04, 93.05; 346/153; 355/40, 64

[56] References Cited

U.S. PATENT DOCUMENTS

| | | | |
|---|---|---|---|
| 2,393,462 | 1/1946 | Gorad et al. | 355/64 |
| 2,881,658 | 4/1959 | Bornemann | 355/29 |
| 2,936,684 | 5/1960 | Simjian | 354/80 |
| 3,263,555 | 8/1966 | Scheib | 355/40 X |
| 3,688,656 | 9/1972 | Applequist et al. | 355/40 X |
| 3,803,628 | 4/1974 | Van Brimer et al. | 346/1 |
| 3,988,062 | 10/1976 | Burton et al. | 355/23 |
| 4,042,298 | 8/1977 | Herrmann | 355/40 |
| 4,069,755 | 1/1978 | Beery | 400/124 X |
| 4,093,370 | 6/1978 | Frech | 355/43 |
| 4,192,618 | 3/1980 | Kondur et al. | 400/124 |
| 4,198,157 | 4/1980 | Johnson | 355/40 |

Primary Examiner—Paul T. Sewell
Attorney, Agent, or Firm—Harry R. Lubcke

[57] ABSTRACT

A programmable printer for printing identifying indicia upon a moving document prior to microfilming the document. The printer is adjustably stationarily mounted above a document transport table. Alphanumeric characters are selectively formed and briefly depressed to print the desired indicia upon successively presented documents while the same are moving. A programmable microcomputer forms the characters from predetermined data and applies each in correspondence with the motion of the document at an interval of time when microfilming is not occurring.

18 Claims, 7 Drawing Figures

INDICIA PRINTER

BACKGROUND OF THE INVENTION

This invention pertains to elemental type printing means for printing upon a moving document.

U.S. Pat. No. 4,093,370, R. Frech, "Indicia Recording Device", granted June 6, 1978, provides an auxiliary indicia device that presents an optical image of indicia at one side of the objective lens of a microfilm camera for imaging upon the film within the camera at one side of the main image.

U.S. Pat. No. 3,988,062, Burton & Whitney, "Two-Sided Document Recorder", granted Oct. 26, 1976, provides document transport means, upon which the printer of this invention may be mounted.

U.S. Pat. No. 2,936,684, L. Simjian, "Depository Machine Combined with Camera Means", granted May 17, 1960, discloses a stamping device, electrically operated, to stamp a serial number, date, and other desirable information on a bank deposit slip while the slip is stationary.

U.S. Pat. No. 2,881,658, W. Bornemann, "Photographic Recording Apparatus," granted Apr. 14, 1959, discloses optical mirror means for exposing an indicia pattern at one side of a microfiche as this is formed from the exposure, previously, of documents that are stationary on a table.

U.S. Pat. No. 3,803,628, R. Van Brimer et al, "Apparatus and Method for Positionally Controlled Document Marking", granted Apr. 9, 1974, discloses an array of twenty-one charge-ring-actuated ink jets, suited for simultaneously printing two rows of characters. A document 10 is moved past the ink jets at one undisclosed speed. Characters to be printed are read out from a memory apparatus 39. An edge-of-document sensing means 11, 15 is an inherent part of the apparatus and method.

No combination of the above means with means for photographing a document is suggested, nor of providing different speeds of translation for the photographing vs. the printing processes.

U.S. patent application, Ser. No. 35,025, filed May 6, 1970, of Richard Don Freeman, discloses a FIG. 1 at 197 USPQ 466 of In re Freeman, CCPA No. 75-531. A general purpose computer 100 is supplied with data from keyboard 140. There is a font library store 160, and a read-out cathode-ray tube 175.

Paper documents are not involved in any way.

BRIEF DESCRIPTION OF THE INVENTION

A linearly-synthesized character (matrix) printer prints human-readable legends, upon typically an upper margin of a moving document.

The printer is stationarily mounted upon a document transport means and functions mutually exclusively with document photographing means that are associated with the transport means.

The printer is microcomputer controlled. Data relating to the text to be printed enters the microcomputer, and commands to actuate the several dot elements of the matrix to synthesize the characters form a principal output of the microcomputer.

The microcomputer is interfaced with logic that controls the document transport, so that the desired indicia will be printed in a time interval available for such printing; i.e., when photographing of the document and related translation of the document are not occurring.

Also, interfacing arranges that indicia printing will take place at a reduced speed of translation of the document with respect to the speed of translation of the document that is related to the photographing process.

DESCRIPTION OF THE PREFERRED EMBODIMENTS

Figure 1:
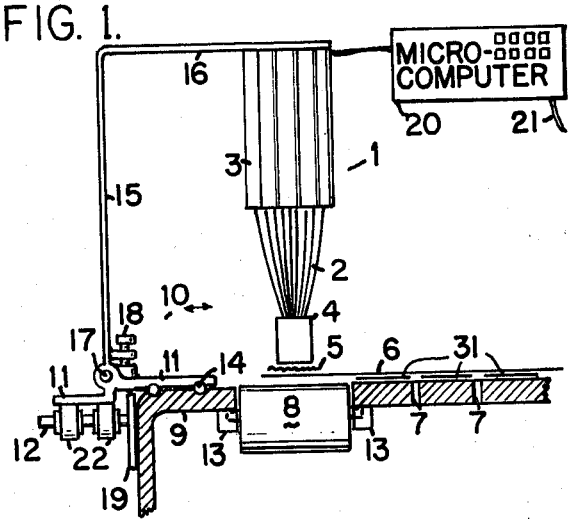
FIG. 1 shows the indicia printer in side elevation, partly schematic, and, in part, the transport means with which it is associated, partly in section.

In FIG. 1, numeral 1 generally indicates a synthesized-character (matrix) printer.

The printer may have a plurality, say nine, of tungsten carbide wires 2. Each wire is mechanically coupled to an electromagnetic actuator, generally indicated by numeral 3. The actuators are typically arranged in a circle that has as small a circumference as the diameter of each actuator will permit.

Figure 2:
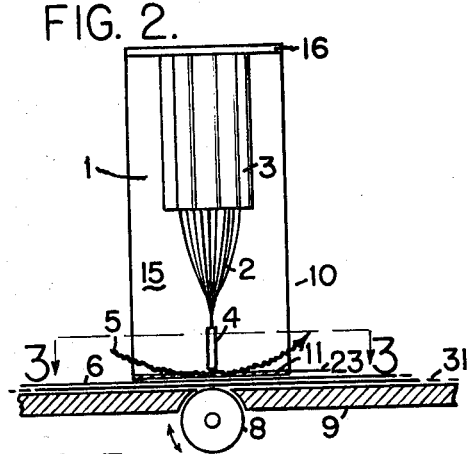
FIG. 2 shows the same, but in end elevation; section 2—2, FIG. 3.
Figure 3:
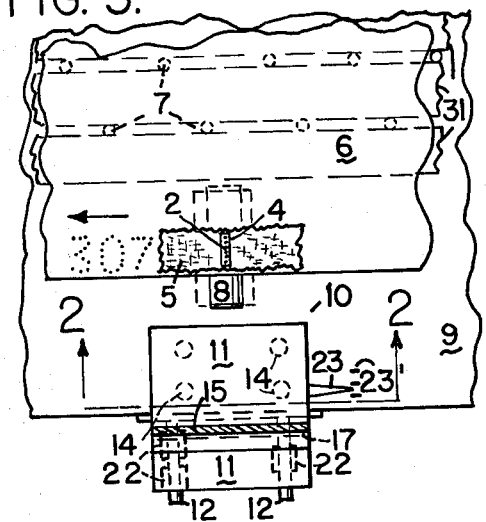
FIG. 3 shows the same in plan, looking down from above, along section line 3—3 in FIG. 2.

The wires, being flexible, are converged into guide 4, which has a narrow rectangular shape, so that the wires are closely linearly aligned; as will be noted in the several views of FIGS. 1 through 3.

An inked ribbon 5 is positioned below the lower extremities of these wires. The ribbon may be slowly moved to present a fresh inked surface to the wires. This may be accomplished by a geared motor, not shown.

The document, 6, is translated directly below the ribbon.

In FIGS. 1 and 3 it is evident that the indicia is being printed at a margin, say the lower margin, as indicated in FIG. 3. In FIG. 2 the whole margin sweeps past from right to left.

The document is conveyed by plural belts 31 that are further described in U.S. Pat. No. 3,988,062, Burton and Whitney, "Two-Sided Document Recorder", of common Assignee; which patent is included in this specification by reference. Numerous vacuum apertures 7 cause the document to closely adhere to belts 31.

At the left in FIG. 3, and merely illustrative, are the numerals "307" on document 6. These have passed the printer wires 2 assembly. This is indicated by the arrow above the numerals, which shows the direction of travel of the document.

Cylindrical platen 8 is mounted upon table 9 of the transport structure according to U.S. Pat. No. 3,988,062. The platen is made of hardened steel, while the table is typically made of aluminum.

The platen receives the hard blows of hardened wires 2 (through the ribbon and document). The axis of the platen is parallel to the alignment of wires 2; thus, an even and incrementally flat surface is presented for printing. Normally, the platen is rotated incrementally by hand, as when a new ribbon is installed or when some other service activity takes place. This provides a new striking surface.

In the figures the vertical spacing between elements 4, 5, 6, 8 & 9 is greater than in actual practice. The showing here is for sake of clarity.

Carriage 10 supports the matrix printer. The carriage has a stepped-shape base 11; the underneath of the outer part which carries three ball bushings.

Two cylindrical rods 12 are rigidly attached to plate 19, which in turn is perpendicularly fastened to base 9 of the document transport when this indicia printer is made a part of the same.

Two ball bushings 22 surround one rod 12 and one surrounds the other rod 12, giving a three-point suspension.

Detents 14, which may be spring-tensioned balls that relax into depressions in table 9, give plural selected positions for the indicia printer carriage with respect to the edge margin of the document. Thus also the position of the printed indicia.

Carriage 10 has a vertical support portion 15, a top horizontal portion 16, and hinge means 17.

Portions 15 and 16 serve the necessary purpose of supporting matrix printer 1. The hinge 17 is located at the junction between base 11 and portion 15. It allows printer 1 and portions 15 and 16 to be hinged backward to the left in FIG. 1, thereby exposing the working ends of wires 2, ribbon 5, etc. for inspection, cleaning, or repair. When in the operating position, the hinged structure is locked in place by a shoulder screw 18, which threads into base 11.

An additional adjusting screw (not shown) is carried by vertical support 15 and bears upon base 11, to allow exact alignment of support 15, and so also of printing wires 4.

Printer microcomputer 20 is connected to each of actuators 3 for the selective actuation of each. With the keyboard of the microcomputer the operator can enter the indicia text desired. Depressing the "3" key causes wires 2 to punch down at the proper time, as determined by stored instructions, to form a "3". Conductor 21 interfaces to transport logic 44, for required coaction between the printer and the belts 31, etc.

Indicator 23 is attached to base 11. It coacts with visible marks on transport table 9 to inform the operator as to which detent position is occupied by the carriage. The indicator may be a pointer as shown, or white marks visible through slots in a thin sheet cover (not shown) placed over the table.

Figure 4:
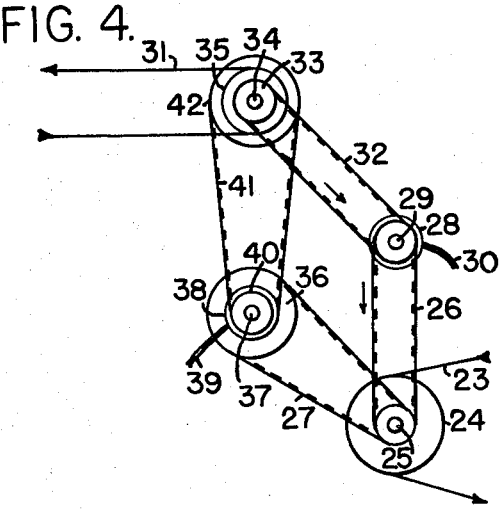
FIG. 4 shows schematically the two clutch means for obtaining plural document speeds.

FIG. 4 shows one embodiment for means to drive transport belts 31 selectively at two different speeds.

The present state of the art of matrix printers requires that the speed of translation of document 6 be reduced from a speed of 254 centimeters (cm) per second that is employed for manipulation associated with photographing the document, to a speed of 46 cm/sec., in an illustrative embodiment.

In FIG. 4, belt 23 is from the drive motor for the document transport according to U.S. Pat. No. 3,988,062. This belt drives pulley 24 on shaft 25. Also upon shaft 25 are two sprocket pulleys, one of which drives toothed belt 26 for the fast speed and the other of which drives toothed belt 27 for the speed-reducer slow speed. Other types of belts, of which the "V" belt is one example, may be employed as an alternate embodiment.

Belt 26 drives pulley 28 in a one-to-one speed ratio. On the same shaft as pulley 28 is electrically operable clutch 29, having electric conductor 30, to enable drive by the clutch upon electrical energization from transport logic means 44 (not shown in FIG. 4). With the clutch energized, a second pulley (behind pulley 28 and thus not seen) drives belt 32.

Belt 32 drives sprocket pulley 33; the pulley being on shaft 34. The speed ratio from shaft 25 to shaft 34 is one-to-one. This gives a document translational velocity of 254 cm/sec.

Belt roller 35 is one of two that drive belts 31 of the document transport. These belts are also shown in FIGS. 1 through 3.

On the speed reduction path, belt 27 passes over large sprocket pulley 26, which is mounted on shaft 37. This shaft also carries clutch 38, which is the equivalent of prior clutch 29, and has electric conductor 39 for energization, this time from microcomputer 20.

The shaft also carries small sprocket pulley 40, upon which toothed belt 41 runs. Belt 41 also runs upon second large pulley 42, which is mounted on shaft 34.

When clutch 38 is energized, small pulley 40 rotates, and so also large pulley 42; thus belts 31 move. This gives the slow speed of translation of belts 31 of 46 cm/sec.

Microcomputer 20 logic prevents clutches 29 and 38 from both being energized at the same time, since that would result in excessive clutch wear and uncertain drive speed.

Figure 5:
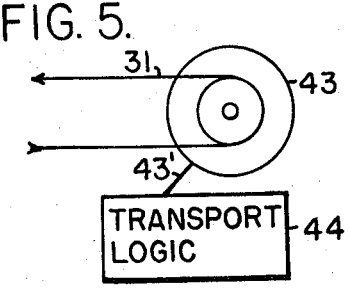
FIG. 5 shows schematically a servo motor means for obtaining plural document speeds.

FIG. 5 shows an alternate embodiment of plural speed means to that of FIG. 4.

In FIG. 5, plural speeds for belts 31 are obtained by employing only one servo motor 43. The control of this motor may be by transport logic 44. One frequency of alternating current electrical energy provides a belts 31 speed of 254 cm/sec. and a lower frequency for a belt speed of 46 cm/sec.

As an alternate, a stepper motor may be employed, and stepping pulses of desired repetition rates supplied from transport logic 44.

Herein, both sinusoidal alternating current and recurrent spaced unidirectional pulses are termed alternating current electrical energy.

Figure 7:
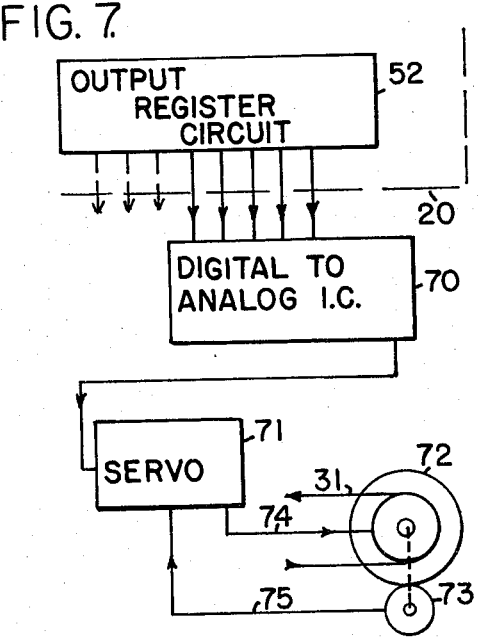
FIG. 7 shows schematically an alternate servo motor means for obtaining plural document speeds.

An alternate structure to FIG. 5 is shown in FIG. 7, in which microcomputer 20 is involved.

Additional available outputs from output register circuit 52, say five, are programmed to form a 5 digit digital word. This allows 32 different speeds to be selected by the operation of a conversion means, such as a digital to analog integrated circuit 70, which may be a type MC1408.

Typically, a normal and a slow speed are selected, as has been previously set forth. This circuit allows 16 choices for each of these speeds.

Element 70 is connected to servo amplifier circuit 71, which may be a Glentec type GA4552.

Servo 71 is connected, by connection 74, to motor 72, which may be a permanent magnet type direct current servo motor.

The motor is suitably energized to rotate at one of the selected speeds. Tachometer 73 is attached to the motor shaft, and provides an electrical output that is conveyed by connection 75 back to servo 71, the amplitude of which is dependent upon the speed of rotation of the motor.

Servo 71 adjusts the amplitude of the electrical energy supplied to the motor accordingly, so that the selected constant speed is maintained.

Figure 6:
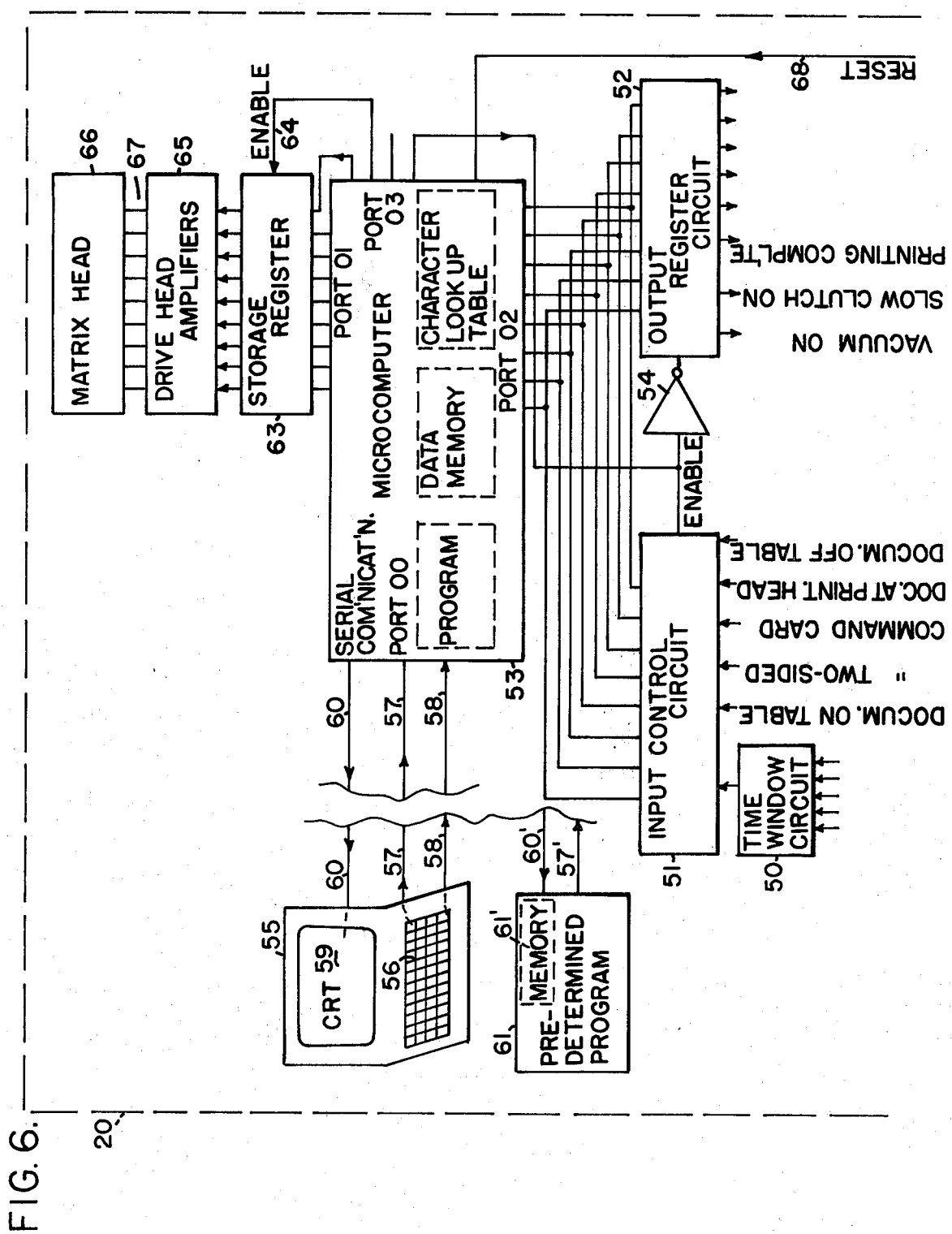
FIG. 6 is a diagram of the microcomputer of the indicia printer apparatus and the interface thereof with the logic of the transport means.

FIG. 6 shows the programmable microcomputer 20 of the indicia printer, and its interface with logic means 44 of the transport means 9, 31.

Programmable microcomputer 20 takes command of the whole system in the time interval during which printing takes place. When this interval shall occur is dictated by constraints from transport logic means 44, such as when the camera involved is taking a photograph.

These constraints all become inputs to time window circuit 50. A single output therefrom results and becomes an input to input control circuit 51.

The inputs comprise command signals for taking a photograph per se, moving a document to the photographing station, turning a document over in the time interval between taking a first and a second photograph, moving a document away after it has been photographed, and so on.

Other inputs to input control circuit 51 arise from sensors, or commands that are a part of the transport means that are represented by table 9 and/or transport logic means 44.

The "Document on table" input control circuit 51 arises from a sensor on table 9 of the document transport. It is taken from the output of OR gate 134 of FIG. 7 of that patent; i.e., U.S. Pat. No. 3,988,062. When the present Indicia Printer is attached to the document transport the output connection from gate 134 is removed from entering state counter 130 and goes only to the present input control circuit 51. A connection from the present output register circuit 52, "Endorser complete", returns to state counter 130 instead of the former connection.

In a similar manner, the "Document two-sided" input to input control circuit 51 arises from FIG. 8 of the patent, also, the "Command card". The latter is a specialized document that has specific band markings to signal the document transport to perform or inhibit a two-sided regimen, or similar functions, such as inhibiting photographing a document. The Command card and apparatus for functioning with it are set forth in U.S. Pat. No. 3,922,084 (B430,140) issued Nov. 25, 1975, to Burton and Whitney, which patent is made a part hereof.

Similarly, the "Document at printing head" is an input. It signifies that the document is in the correct position for printing by this Indicia Printer to take place.

The "Document off of table" is a similar input. It comes from logic means 44 of the transport and signifies that the document has left the feed table.

Output register circuit 52 provides further outputs to transport logic means 44.

One is the "Vacuum on" command.

From register 52 a connection enters the K input of J-K flip-flop 139 of FIG. 7 of U.S. Pat. No. 3,988,062. It is preferred that this be arranged by inserting an OR gate with the output connected to the K input of the flip-flop. One input to the OR gate is the output from output register circuit 52 herein, and the other is the output of the transport negative-OR gate 138.

A second command is "Slow clutch on".

This provides the required reduced speed of document transport that is obtained by energizing clutch 38 in FIG. 4, herein. The combined logics 20 and 44 arrange that the normal speed of document transport clutch 28 shall not be energized while clutch 38 is energized, and vice versa.

Both input control circuit 51 and output register circuit 52 are connected by eight conductors to port 02 of microcomputer 53. This duality is made single-functioned by inverter amplifier 54. An "Enable" output comes from microcomputer port 03. This output passes into input control circuit 51 in positive polarity and allows that circuit to enter data into port 02.

Through inverting amplifier 54 this same pulse enters output register 52 as a negative pulse, and so has no effect upon that circuit.

When an output from output register circuit 52 is to occur, a negative enable pulse comes from microcomputer port 03. This allows a positive enabling pulse to enter the output register (because of inverter 54), and the negative pulse into input control circuit 51 is of no effect.

Output register circuit 52 is latched, so that signals therein are continuously available to transport logic 44 (until the end of the sequence).

Keyboard and cathode-ray tube (CRT) entity 55 is an operator-operated input device for entering data into microcomputer 53.

Keyboard 56 is a known computer-input keyboard, having the general characteristics of a typewriter and providing a unique electrical signal for each key that is depressed.

Conductor 57 conveys these signals to Serial communication port 00 in FIG. 6.

Conductor 58 conveys a signal from a "BREAK" key on keyboard 56 to an Interrupt T input of microcomputer Port 00. This key is depressed by the operator when it is desired to Reset the microcomputer; to bring it back to the initial mode. This may be desired because of an error situation, the desire to enter new data, or the like.

CRT 59 is provided with a blank raster by known television scanning apparatus (not shown). The CRT forms clearly defined letters and/or numerals by employing a wide-band video amplifier, as in known computer readout apparatus.

Readout signals from microcomputer 53 are fed to CRT 59 via conductor 60.

By means of a program formulated from the various method steps involved in the functioning of the Indicia Printer the microcomputer spells out in human-readable words on the CRT queries to the operator, step by step, as to what the operator wishes to do. The operator responds by typing his choice on keyboard 56.

An alternate input source of data is possible.

Predetermined data source 61 contains a data memory 61', such as a magnetic disk. Upon this disk alphanumeric data, such as the number of each document, the job number, and/or other similar information is recorded by other means not shown, in the order that the documents to be micro-photographed will go through transport system 9, 31.

Output conductor 57' is connected to conductor 57 of Port 00 in place of the corresponding conductor from keyboard 56. Return information conductor 60', for control commands, is connected to conductor 60 of Port 00.

In operation, the documents are arranged in order to be fed to the feed input table of the document transport, and the memory record is made available in predetermined device 61.

Upon pressing a start button activating document transport logic 44, the two entities act sequentially in synchronism.

Typically, nine conductors provide an output from microcomputer 53 Port 01, to storage register 63. Storage is enabled in that register by an Enable command upon conductor 64. This command comes from Port 03 of the microcomputer.

The information to register 63 is digital, "on" or "off", as to subsequent actuation of each of nine elementary print electro-mechanical linearly aligned elements.

The nine stored outputs from storage register 63 pass into a like number of head drive amplifiers. These are collectively shown as 65 in FIG. 6. These amplifiers raise the power level from that of instrument logic to many watts during the brief time intervals of the actuation of the printer elements per se.

Further, nine conductors individually convey actuating power from the head drive amplifiers 65 to corresponding elements in matrix head 66. These elements are selectively actuated to print out the alpha-numeric characters commanded by data input instrumentalities 56 or 61. Note FIGS. 1, 2, and 3, herein. The nine separate conductors are identified as a group by numeral 67.

Internal details on the several elements of the logic of FIG. 6 follow.

Microcomputer 53 may be an Intel SBC 80/04 type. This computer has three areas of memory internally. These are utilized as the program area, the data-memory area, and the character look-up table. The latter contains information for the energization and timing for the printing elements of matrix head 66 for forming each alpha-numeric character. Input and output hardware is also included.

In the preferred embodiment the program for the microcomputer is modifiable in that the program desired can be selected during initialization by the operator from a number of predetermined choices. Typically, the operator does not have direct and detailed control of the program that is within the microcomputer. The operator does have selective control of a relatively large number of choices. The choices are made known to the operator by readouts from the programmed memory of the microcomputer upon the CRT.

Input control circuit 51 includes an eight input register, which may be a type 74LS244 integrated circuit (IC). The several inputs shown entering circuit 51 pass variously through principally AND and OR gates and inverting amplifiers in order to appropriately enter the input register.

Similarly, several inputs that have to do with the availability of the document and the status of the document transport so as to allow indicia printing that enter time window circuit 50 are combined through AND and OR gates to provide a single answer via the single conductor shown between entities 50 and 51 in FIG. 6.

Output register circuit 52 includes an eight input and eight output programmable medium scale integrated circuit register, which may be a type 74LS259. Three inputs to the register compose a 3 bit binary word. A fourth input carries the data, which data is directed to an output that depends upon the content of the binary word. Thus, any output of this register can be selectively turned on or off.

In this illustrative embodiment only three of the eight possible outputs are used. These have been previously identified. If FIG. 7 is employed for servo purposes the remaining five outputs are also used.

A "RESET" input is received from transport logic 44, as has been mentioned above. This enters microcomputer port 03 directly, via conductor 68, to an "Interrupt" terminal therein.

Data input entities 55 and 61 have been previously detailed.

Storage register 63 may be an 74LS174 integrated circuit.

Head drive amplifiers may principally involve a TIP122 power transistor.

The printing head per se, comprised of elements 2 through 5, is commercially obtainable and has been previously described. It may be a type 62001136-5002, manufactured by Centronics, Inc.

As has been mentioned, the operator makes choices of predetermined program options that suit the apparatus to the indicia printing that is to be accomplished.

An important choice is whether the printing on the document will consist of identifying data only, or whether this will be combined with a serial count numeral. That is, the numeral "1" for the first sheet, "2" for the second sheet, and so on.

The above program choices enter the program area of microcomputer 53. In addition, there are numerous fixed aspects of the program. These are associated with the input control circuit 51 and other interactive aspects with the document transport. The "Document on table" input information is one item of data that the program must accept and then act upon that information.

In the data memory area of microcomputer 53 the specific information to be printed is accepted. Examples are, "Fiche No. 1325, Page No. 41", or "List of drawings for M-3 Device".

In the character look-up table area of the memory area of microcomputer 53 are retained the energizing instructions to the elements of matrix head 66 in FIG. 6. An example is for forming the numeral "3". Of course, instructions for all other alpha-numeric characters are also stored in the memory.

This table part of the memory is not a part of the program that is interactive with the operator. The instructions for forming the alpha-numeric characters are always the same.

The logic of FIG. 6 operates on time as the parameter; i.e., events are sequenced according to time intervals.

The constancy of document drive 31 is sufficient with alternating current motors so that the shapes of the numerals and the letters is proper in each instance.

The Indicia Printer per se, as herein embodied, is necessarily a coactive attachment to a document transport system.

We claim:

1. The method of printing plural indicia characters successively upon documents prior to sequentially photographing said documents, which comprises the method steps of;
    (a) electrically storing data pertinent to printing said indicia characters,
    (b) electrically storing instructions and acting upon document actuated sensor responses relating to the availability of an uninterrupted period of time devoid of photographing a first document for printing upon a second document,
    (c) uniformly translating said second document during a said uninterrupted period at a specified slower speed during printing upon said second document than at other times relating to translating said first document,
(d) successively selectively impressing plural dot elements of a given character aligned along a stationary line that is transverse to the direction of translation of said second document according to the stored data, and in synchronism with the slower translation of said second document, to print the character upon said second document by mechanical contact with said second document,
(e) controlling the time and position of impressing said plural dot elements to successively form plural characters that are aligned in the direction of translation of said second document, and
(f) subsequently translating said second document for photographing according to the method steps previously recited for said first document.

2. A programmable printer for printing upon moving documents prior to sequentially photographing said documents (6), comprising;
(a) transport means (31) to translate a first document rapidly for manipulation related to photographing, and to hold it stationary for photographing,
(b) logic means (44) to control said transport means, to reduce the rapidity of translation for a second document while said printing is occurring thereon,
(c) a stationary character-synthesizing printer (1), having elements (2) aligned transversely of the direction of motion of said documents,
(d) means to selectively electrically actuate (3,64,65) said elements, to linearly print characters upon said second document while it is slowly translating, and
(e) a programmable microcomputer (20) having a character lookup table (53), a time window circuit (50) and an input control circuit (51) to successively selectively synthesize the characters for the printer,
said microcomputer electrically connected to said printer and also to said logic means (44) and document actuated transport sensors
to synchronize the actuation of the printer with the movement and manipulation of said first and second documents, through said time window circuit and said input control circuit
for inhibiting printing upon said second document while photographing said first document.

3. The programmable printer of claim 2, which additionally includes;
(a) means having alternate drive paths to mechanically drive (28, 38 or 43 or 72) said transport means at plural specific speeds, and
(b) electrical interconnections between said programmable microcomputer (20), said logic means (44), and said means to mechanically drive, to control said transport means (31),
so that said transport means shall be driven at a slower said specific speed during the time interval utilized for printing than at other times.

4. The programmable printer of claim 3, in which said means to mechanically drive includes;
(a) a normal-speed drive path (26,32), having a first logic-actuated clutch (28), with control by said logic means (44),
(b) a speed-reducing drive path (27,41), having a second microcomputer-actuated clutch (38), with control by said programmable microcomputer (20), and (c) further control means (52), operable from said programmable microcomputer (20) to selectively actuate said second clutch and concomitantly inhibit operation of said first clutch,
to reduce the rapidity of translation of said document while printing is occurring.

5. The programmable printer of claim 3, in which said means to drive includes;
(a) a servo-motor (43 or 72),
(b) means to selectively actuate said servomotor at plural constant speeds (44 or 52,70,71,73), and
(c) at least one electrical connection (43' or 74,75) between said means to selectively actuate and said servo motor.

6. The programmable printer of claim 5, in which;
(a) said servo-motor (43) is operable on alternating current, and
(b) plural constant frequencies of alternating current are selectively supplied from said logic means (44) to said servo-motor, to selectively actuate said servo-motor at said plural constant speeds.

7. The programmable printer of claim 5, in which;
(a) said servo-motor (72) is operable on direct current, and
(b) said means to selectively actuate said servo-motor comprises;
(A) a programmable register (52), to form a selected digital word,
(B) conversion means (70) connected thereto to form an analog amplitude of electrical energy related to said digital word, and
(C) a servo circuit (71) connected to said conversion means and to said servo-motor to selectively actuate said servo-motor at said plural constant speeds.

8. The programmable printer of claim 2, which additionally includes;
(a) guide means (12) attached to the structure of said transport means (31),
(b) a carriage (10) to adjustably support said printer (1), riding upon said guide means,
(c) a hinge (17) interposed between said carriage and said printer, to allow said printer to be moved away from said carriage, and
(d) a locking screw (18) to selectively retain said printer upon said carriage.

9. The programmable printer of claim 8, which additionally includes;
(a) detent means (14), operative between said structure of said transport means and said carriage (10), to index plural positions of said carriage transverse to the direction of motion of said transport means (31).

10. The programmable printer of claim 9, which additionally includes;
(a) position-indicating means having visible indicating means (23) translatable with said carriage (10), and
(b) coactive visible indicating means (23') stationary with respect to said structure of said transport means (31).

11. The programmable printer of claim 2, which additionally includes;
(a) a cylindrical platen (8), having an axial length in excess of the diameter thereof,
(b) rigid mounting means (13) within said transport means to allow rotation of said cylindrical platen, to so position said cylindrical platen to support said document for unyieldingly receiving imprints from said printer along an area of the periphery of said cylindrical platen that lies parallel to the axis thereof, and that is changed by incrementally revolving said cylindrical platen.

12. The programmable printer of claim 2 in which said programmable microcomputer (20) comprises;
   (a) a microcomputer (53) having a memory,
   (b) first means (55 or 61) to input data pertinent to the program to said microcomputer (53),
   (c) second means (51,50) to convey data pertinent to the uninterrupted period from said logic means (44) into said microcomputer,
   (d) third means (52) to convey data during the uninterrupted period from said microcomputer to said logic means (44), and
   (e) fourth means (63,65) to convey data from said microcomputer to said printer during the uninterrupted period for the actuation thereof.

13. The programmable printer of claim 12, in which said first means (55) comprises;
   (a) a manual keyboard (56),
   (b) a first electrical connection (57) from said keyboard to said microcomputer (53) to enter data thereinto, and
   (c) a second electrical connection (58) from said keyboard to said microcomputer (53) to reset the same.

14. The programmable printer of claim 13, in which said first means (55) further comprises;
   (a) visual indicating means (59), and
   (b) a third electrical connection (60) from said microcomputer (53) to said visual indicating means, to display data from said memory upon said visual indicating means.

15. The programmable printer of claim 12, in which said first means (61) comprises;
   (a) a data memory (61′) for storing predetermined alpha-numeric data,
   (b) a first electrical connection (57′) from said data memory (61′) to said microcomputer (53) to enter data thereinto, and
   (c) a second electrical connection (60′) from said microcomputer (53) to said first means (61) for the control of the same.

16. The programmable printer of claim 12, in which said second means comprises;
   (a) an input control circuit (51),
   (b) a time window circuit (50), connected from said logic means (44) to said input control circuit (51), to convey data relating to the time interval during which printing by said programmable printer may be accomplished,
   (c) connections from said logic means (44) to said input control circuit to convey data from said logic means to said control circuit for correlating the motion of a document that is to be printed-upon with the actuation of said printer, and
   (d) connections from said input control circuit (51) to said microcomputer (53).

17. The programmable printer of claim 12, in which said third means comprises;
   (a) an output register circuit (52),
   (b) plural connections from said microcomputer (53) to said output register circuit, and
   (c) connections from said output register circuit to said logic means (44), to control said logic means as required for the correlated operation related to uninterrupted period of said programmable printer.

18. The programmable printer of claim 12, in which said fourth means comprises;
   (a) a storage register (63) connected for actuation by said microcomputer (53),
   (b) plural electrical drive means (65) connected to said storage register to individually energize said drive means according to the actuation status of said register, and
   (c) plural individual connections (67) from said plural electrical drive means to individually actuate the elements of said character-synthesizing printer (1,66).

* * * * *